(12) United States Patent
Kiernan et al.

(10) Patent No.: US 8,774,127 B2
(45) Date of Patent: *Jul. 8, 2014

(54) WIRELESS METROPOLITAN AREA NETWORK ARCHITECTURE FOR MANAGING NETWORK RESOURCES AND MOBILITY

(75) Inventors: Brian G. Kiernan, Downingtown, PA (US); Maged M. Zaki, San Diego, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/959,430

(22) Filed: Dec. 3, 2010

(65) Prior Publication Data

US 2011/0069678 A1    Mar. 24, 2011

Related U.S. Application Data

(63) Continuation of application No. 11/261,336, filed on Oct. 28, 2005, now Pat. No. 7,848,291.

(60) Provisional application No. 60/625,628, filed on Nov. 5, 2005.

(51) Int. Cl.
| | |
|---|---|
| *H04W 4/00* | (2009.01) |
| *H04B 7/00* | (2006.01) |
| *H04L 12/28* | (2006.01) |
| *H04H 20/71* | (2008.01) |
| *H04B 7/24* | (2006.01) |
| *H04B 1/38* | (2006.01) |

(52) U.S. Cl.
USPC .......... 370/331; 370/310; 370/351; 455/3.01; 455/39; 455/73

(58) Field of Classification Search
None
See application file for complete search history.

(56) References Cited

U.S. PATENT DOCUMENTS

| | | | |
|---|---|---|---|
| 5,936,949 | A | 8/1999 | Pasternak et al. |
| 7,072,657 | B2 * | 7/2006 | Watanabe et al. ............. 455/439 |
| 7,096,022 | B2 * | 8/2006 | Gao et al. ...................... 455/444 |
| 7,212,511 | B2 | 5/2007 | Jonsson et al. |
| 7,245,917 | B2 | 7/2007 | Chiueh |
| 7,483,984 | B1 | 1/2009 | Jonker et al. |
| 7,574,205 | B2 | 8/2009 | Lee et al. |

(Continued)

FOREIGN PATENT DOCUMENTS

| | | |
|---|---|---|
| RU | 2003117017 | 12/2004 |
| WO | 01/35586 | 5/2001 |
| WO | 2006/037386 | 4/2006 |

OTHER PUBLICATIONS

"802 Handoff ECSG Agenda R1", (Jan. 13, 2004).

(Continued)

*Primary Examiner* — Hassan Phillips
*Assistant Examiner* — Lonnie Sweet
(74) *Attorney, Agent, or Firm* — Volpe and Koenig, P.C.

(57) ABSTRACT

The present invention proposes an infrastructure to enable seamless mobility for wireless metropolitan area networks (WMANs) and to provide for management of spectrum and network resources. An WMAN reference model is introduced where the radio resource management (RRM) and handover (HO) sub-layer is introduced into the protocol stack. The WMAN management plane is responsible for the RRM and HO management. Several physical and logical network architecture options for WMAN management are proposed.

7 Claims, 4 Drawing Sheets

(56) References Cited

U.S. PATENT DOCUMENTS

| | | | |
|---|---|---|---|
| 7,684,342 B2 * | 3/2010 | Gupta et al. | 370/252 |
| 7,684,380 B2 * | 3/2010 | Odman | 370/348 |
| 7,738,871 B2 | 6/2010 | Olvera-Hernandez et al. | |
| 7,848,291 B2 * | 12/2010 | Kiernan et al. | 370/331 |
| 7,899,458 B2 | 3/2011 | Kakishima et al. | |
| 7,917,121 B2 | 3/2011 | Kim et al. | |
| 2002/0146000 A1 | 10/2002 | Jonsson et al. | |
| 2003/0050068 A1 | 3/2003 | Woxberg et al. | |
| 2003/0179731 A1 | 9/2003 | Noguchi et al. | |
| 2004/0090956 A1 | 5/2004 | Schmidberger | |
| 2004/0114553 A1 * | 6/2004 | Jiang et al. | 370/328 |
| 2004/0116120 A1 * | 6/2004 | Gallagher et al. | 455/436 |
| 2004/0215817 A1 | 10/2004 | Qing et al. | |
| 2005/0255879 A1 | 11/2005 | Shi et al. | |
| 2006/0019656 A1 | 1/2006 | Gallagher et al. | |
| 2006/0111111 A1 | 5/2006 | Ovadia | |
| 2006/0153235 A1 | 7/2006 | Kiernan et al. | |

OTHER PUBLICATIONS

"802 Handoff ECSG Comment Resolution", (Nov. 2003).
"802 Handoff ECSG Criteria for Standards Development (Five Criteria)", Version 1, Total p. 3, (Nov. 2003).
"802 Handoff ECSG Criteria for Standards Development (Five Criteria)", Version 2, Total p. 4, (Nov. 2003).
"Cross Bearer Handover—1 Domain", (Jul. 2004).
"IEEE P802.21 Media Independent Handover Service Draft Technical Requirements", IEEE802.21-04/00xx-00, (May 13, 2004).
"Requirements and Suggested Amendments for IEEE 802.16", IEEE 802.21 Media Independent Handover Services, 21-05-0339-00-0000-Requirements_Amendments_802_16, (Aug. 2005).
"Unresolved Comments in Requirements Document as of Aug. 9, 2004", Version 1, Total p. 5, (Aug. 9, 2004).
"Unresolved Comments in Requirements Document as of Aug. 9, 2004", Version 2, Total p. 3, (Aug. 9, 2004).
3GPP Liaison Package Development Ad Hoc Group, "802.21-3GPP Requirements Ad Hoc Report", IEEE 802.21 Media Independent Handover, 21-05-0000-00-0000, (Sep. 14, 2005).
3GPP Liaison Package Development Ad Hoc Group, "Proposed 802.21 Presentation for 3GPP", IEEE 802.21 Media Independent Handover, 21-05-0300-08-0000, (Sep. 14, 2005).
3GPP Liaison Package Development Ad Hoc Group, "Proposed 802.21 Presentation for 3GPP", IEEE 802.21 Media Independent Handover, 21-05-0300-09-0000, (Sep. 14, 2005).
3GPP Liaison Package Development Ad Hoc Group, "Proposed IEEE 802.21 Presentation for 3GPP", IEEE 802.21 Media Independent Handover, 21-05-0300-12-0000, (Sep. 20, 2005).
802.16 IEEE Standard for Local and Metropolitan Area Networks, Part 16: Air Interface for Fixed Broadband Wireless Access Systems, (Oct. 2004).
802.21 Contribution, "Media Independent Handover Functions and Services Specification", IEEE 802.21 MIHO, 21-05-0253-01-0000, (Mar. 14, 2004).
802.21 Contribution, "Media Independent Handover", IEEE 802.21 Media Independent Handover Services, 21-05-0xxx-00-0000-802-1al-proposed-secure-id.doc, (May 2005).
Ad Hoc Group on Evaluation Criteria, "IEEE 802.21 Down Selection Process", IEEE 802.21 Media Independent Handover, 21-04-0215-03, (Jan. 18, 2005).
Ad Hoc Group on Evaluation Criteria, "IEEE 802.21 Down Selection Process", IEEE 802.21 Media Independent Handover, 21-05-0215-04, (Jan. 18, 2005).
Anjum et al., "A Proposal for MIH Function and Information Service", IEEE 802.21 Media Independent Handover, 21-04-165-03-0000, (Jan. 10, 2005).
Bhatt et al., "General Considerations for Media Independent Handover (MIHO)", IEEE 802.21 Media Independent Handover, 21-04-00xx-00-0000, (Jul. 8, 2004).
Bhatt et al., "IEEE 802.21 Media Independent Handover Solution Proposal—Updated with Details (See Abstract Below)", IEEE 802.21 Media Independent Handover, 21-04-0170-00-0000, (Jan. 10, 2005).

Bhatt et al., "Lossless Inter-Technology Handover Using L2 SDU Transmission Indications", IEEE 802.21, 21-05-00xx-00-0021-Lossless_HO.doc, (Jul. 11, 2005).
Bhatt et al., "Requirements for Media Independent Handover: Network Selection, Power Management, Flexible Handover Decision-Making and Layer 2.5 Services", 21-04-00xx-00-0021-cover_sheet.doc, (Jul. 8, 2004).
Bhatt et al., "Workflow for IEEE 802.21 Specification Work", IEEE 802.21 Media Independent Handover, 21-05-00xx-00-XXXX, (Jul. 11, 2005).
Bingqiang et al., "Amendments for Event Register", IEEE 802.21 Media Independent Handover, 21-06-0501-00-0000, (Jan. 6, 2006).
Bingqiang et al., "Comments", IEEE 802.21 Media Independent Handover, 21-06-0502-00-0000, (Jan. 6, 2006).
Bingqiang et al., "Notify High Layer When Events Change", IEEE 802.21 Media Independent Handover, 21-06-0499-00-0000, (Jan. 6, 2006).
Bingyum et al., "Network Selection", IEEE 802.21 MIHS, 21-06-0500-00-0000, (Jan. 6, 2006).
Carlton et al., "3GPP Inter-Action within 802.21", IEEE 802.21 Media Independent Handover, 21-05-0299-00-0000, (Jul. 11, 2005).
Carlton et al., "Editorial Comments on Baseline 802.21 Draft Text", IEEE 802.21 MIHO, 21-05-00xx-00-0000-InterDigitalEditorialUpdates.doc, (Jul. 11, 2005).
Carlton et al., "Media Independent Handover Functions and Services Specification", IEEE 802.21 Media Independent Handover, (Jan. 9, 2005).
Carlton et al., "Media Independent Handover Functions and Services Specification", IEEE 802.21 Media Independent Handover, 21-05-0203-00-0000, (Jan. 9, 2005).
Carlton et al., "Media Independent Handover Functions and Services Specification", IEEE 802.21 MIHO, 21-05-00xx-00-0000-InterDigital3GPPInteraction.doc, (Jul. 11, 2005).
Carlton et al., "Media Independent Handover Functions and Services Specification", IEEE 802.21 Media Independent Handover, 21-05-0203-00-0000, (Mar. 7, 2005).
Carlton et al., "Media Independent Handover Functions and Services Specification", IEEE 802.21 MIHO, (Mar. 7, 2004).
Carlton et al., "Media Independent Handover Functions and Services Specification", IEEE 802.21 Media Independent Handover, 21-05-0248-00-0000, Version 1, (Mar. 14, 2005), (Total p. 8).
Carlton et al., "Media Independent Handover Functions and Services Specification", IEEE 802.21 Media Independent Handover, 21-05-0248-00-0000, Version 2, (Mar. 14, 2005), (Total p. 6).
Carlton et al., "Proposed 802.21 Presentation for 3GPP", IEEE 802.21 Media Independent Handover, 21-07-0000-00-0000, (Jul. 11, 2005).
Carlton et al., "Reference Diagram for Section", 21-04-00xx-00-0021-cover_sheet.doc, (Jul. 14, 2004).
Carlton, "Defining Layer 2.5", IEEE 802.21-xxx, (May 10-14, 2004).
Carlton, "Service Continuity Requirements Definition & Section 2 Requirements Text", 21-04-00xx-00-0021-cover_sheet.doc, (Jul. 8, 2004).
Cheng et al., "An Optimal Method to Reserve Resources in a Handover Operation", IEEE 802.21 Media Independent Handover, 21-06-0498-00-0000, (Jan. 6, 2006).
Daley, "A Personal View of Link-Layer Requirements for Detecting Network Attachment in IPv6", IEEE 802.21 Media Independent Handover, 21-04-00xx-00-0021, (Mar. 16, 2005).
Das et al., "IETF Involvement on Higher Layer Information Service", IEEE 802.21 Media Independent Handover, 21-05-0408-02-0000, Version 2, Total p. 13, (Jan. 2006).
Das et al., "IETF Involvement on Higher Layer Information Service", IEEE 802.21 Media Independent Handover, 21-05-0408-02-0000, Version 1, Total p. 11, (Jan. 2006).
Das et al., "IETF Involvement on Higher Layer Information", IEEE 802.21 Media Independent Handover, 21-05-0408-01-0000, (Jan. 2005).
Das et al., "Information Service (IS) Reference Model, Use Case Scenario and Higher Layer Requirements for 802.21 Information Service (IS)", IEEE 802.21 Media Independent Handover Services, 21-05-0348-00-0000-Higher_layer_Requirements_Information_Service, Version 2, Total p. 10, (Sep. 2005).

(56) References Cited

OTHER PUBLICATIONS

Das et al., "Information Service (IS) Reference Model, Use Case Scenario and Higher Layer Requirements for 802.21 Information Service (IS)", IEEE 802.21 Media Independent Handover Services, 21-05-0348-00-000-Higher_layer_Requirements_Information_Service, Version 1, Total p. 12, (Sep. 2005).
Das et al., "MIH Proposal", IEEE 802.21 Media Independent Handover, 21-05-00202-00-0000_MIH_Proposal_Lucient_Phase II, (Jan. 9, 2005).
Donazzolo et al., "Fixed Mobile Convergence Alliance Handover Requirements", IEEE 802.21-21-05-0354-00-0000, (Sep. 20, 2005).
Edney, "What is an ESS?", IEEE 802.11-04-614-01-frfh, (Jul. 2004).
Eklund et al., "IEEE Standard 802.16: A Technical Overview of the Wirelessman Air Interface for Broadband Wireless Access," IEEE Communications Magazine, vol. 40, No. 6 (Jun. 2002).
Engwer et al., "The Nature of an ESS", IEEE 802.11-04-0629r1, (May 2004).
ES-CS Adhoc Group, "Higher Layer Requirements for Event and Command Services", IEEE 802.21 Media Independent Handover Services, 21-06-0503-01-0000-ES-CS-HL-Reqs.doc, (Jan. 16, 2005).
ES-CS Adhoc Group, "Higher Layer Requirements for Event and Command Services", IEEE 802.21 Media Independent Handover, 21-06-04xx-00-0000-ES-CS-HL-Reqs.doc, (Jan. 16, 2005).
Faccin et al., "802.21 Higher Layer Requirements for IETF", IEEE 802.21 Media Independent Handover, 21-05-0329-00-0000, (Jul. 29, 2005).
Faccin et al., "Nokia MIH Proposal", IEEE 802.21 Media Independent Handover, 21-04-0169-02-0000, (Jan. 10, 2004).
Faccin, "Comments on Information Service (IS) Reference Model for 3G Roaming Case", IEEE 802.21 Media Independent handover Services, 21-05-0xxx-00-0000-Higher_layer_Requirements_Information_Service 3G roaming, (Oct. 2005).
Faccin, "Higher Layer Requirements Strawman", IEEE 802.21 Media Independent Handover, 21-05-0325-00-0000, (Jul. 26, 2005).
Faccin, "Higher Layer Requirements Strawman", IEEE 802.21 Media Independent Handover, 21-05-0325-01-0000, (Jul. 26, 2005).
Feder et al., "Amendment to Section 5.3.2", IEEE 802.21 Media Independent Handover Services, (Jan. 15, 2006).
Feder et al., "IEEE P802.21 Media Independent Handover Service Draft Technical Requirements", 21-04-00xx-00-0021-Req_sec3_5&3_6.doc, (May 9, 2004).
Feder et al., "IEEE P802.21 Media Independent Handover Service Draft Technical Requirements", 21-04-00xx-00-0021-Req_Sect_3&3_3.doc, (May 9, 2004).
Feder et al., "IEEE P802.21 Media Independent Handover Service Draft Technical Requirements", 21-04-00xx-00-0021-Req_Sect_Sect_3_1&3_2.doc, (May 9, 2004).
Feder et al., "IEEE P802.21 Media Independent Handover Service Draft Technical Requirements", 21-04-00xx-00-0021-Req_Section3_4_1.doc, (May 9, 2004).
Feder et al., "IEEE P802.21 Media Independent Handover Service Draft Technical Requirements", 21-04-00xx-00-0021-Req_Section3_4_2.doc, (May 9, 2004).
Feder et al., "IEEE P802.21 Media Independent Handover Service Draft Technical Requirements", 21-04-00xx-00-0021-Req_Section4_2.doc, (May 9, 2004).
Feder et al., "IS Scenario", IEEE 802.21 Media Independent Handover, 21-05-0326-00-0000, (Jul. 28, 2005).
Feder et al., "IS Scenario", IEEE 802.21 Media Independent Handover, 21-05-0326-01-0000, (Jul. 28, 2005).
Feder et al., "Layer 2.5 Functionality", 21-04-00xx-00-0021-Layer2.5functionality, (May 13, 2004).
Feder et al., "MIH Reference Model", 21-04-0095-00-0000-MIH_Reference_Model.doc, (Jul. 15, 2004).
Feder, "Figure 2 Change", IEEE 802.21, 21-05-0370-00-0000-Figure2_change.doc, (Sep. 14, 2005).
Francini et al., "21-05-xxxx-00-0000-GenRefModel.doc", IEEE 802.21 Media Independent Handover Services, 708189_1.DOC, (Jan. 2006).
Francini et al., "21-06-0492-01-0000-GenRefModel.doc", IEEE 802.21 Media Independent Handover Services, 708190_1.DOC, (Jan. 2006).
Francini et al., "21-06-0492-01-0000-GenRefModel.doc", IEEE 802.21 Media Independent Handover Services, 708191_1.DOC, (Jan. 2006).
Francini et al., "Media Independent Handover", IEEE 802.21 Media Independent Handover Services, 707827_1.DOC, (Jun. 27, 2005).
Francini et al., "Media Independent Handover", IEEE 802.21 Media Independent Handover Services, 707834_1.DOC, (Jun. 27, 2005).
Francini et al., "Media Independent Handover", IEEE 802.21 Media Independent Handover Services, 707844_1.DOC, (Jul. 11, 2005).
Francini et al., "Section 1 Modifications", IEEE 802.21 Media Independent Handover Services, 707820_1.DOC, (Jun. 24, 2005).
Francini et al., "Section 2 Modifications", IEEE 802.21 Media Independent Handover Services, 707824_1.DOC, (Jun. 24, 2005).
Golmie, "Initial Proposal on IEEE 802.21 Down Selection Process", IEEE 802.21 Media Independent Handover, 21-04-0152-00-0000, (Oct. 12, 2004).
Govindarajan et al., "Varaha Submission", IEEE 802.21 Media Independent Handover, (Jan. 8, 2004).
Gröting et al., "Callback Status in IS Response Primitive", IEEE 802.21 Media Independent Handover, 21-06-0483-00-0000, (Jan. 9, 2006).
Gröting et al., "Location Information in IS Request Primitive", IEEE 802.21 Media Independent Handover, 21-06-0484-00-0000, (Jan. 9, 2006).
Gröting et al., "Open Issues on ES/CS in IEEE 802.21 Draft (V01)", IEEE 802.21 Media Independent Handover, 21-05-0371-00-0000, (Sep. 14, 2005).
Gröting et al., "Update of Packet Header Format", IEEE 802.21 Media Independent Handover, 21-05-0369-00-0000, (Sep. 14, 2005).
Guiming et al., "Proposal for Power Consumption Information Related to Different Media", IEEE 802.21 Media Independent Handover, 21-05-0458-00-0000, (Dec. 31, 2005).
Gupta et al., "A Generalized Model for Link Layer Triggers", IEEE 802.21, (Mar. 1, 2004).
Gupta et al., "Information Elements", IEEE 802.21 Media Independent Handover Services, 21-05-0401-02-0000-Information_Elements, (Nov. 2005).
Gupta et al., "Information Elements", IEEE 802.21 Media Independent Handover Services, 21-06-0401-03-0000-Information_Elements, (Jan. 2006).
Gupta et al., "Media Independent Handover", IEEE 802.21 Media Independent Handover Services, (Jan. 2005).
Gupta et al., "Media Independent Handover", IEEE 802.21 Media Independent Handover Services, 21-05-0361-00-0000-Section5_Changes, (Sep. 2005).
Gupta et al., "Requirements and Suggested Amendments for IEEE 802.16", IEEE 802.21 Media Independent Handover Services, 21-05-0335-01-0000-Requirements_Amendments_802_16, (Aug. 2005).
Gupta et al., "Media Independent Handover Service Draft Technical Requirements," 21-04-0087-12-0000, (Sep. 21, 2004).
Gupta, "Figure 15", IEEE 802.21 Media Independent Handover Services, 21-06-0474-00-0000-Figure 15, (Jan. 2006).
Gupta, "Global Network Neighborhood", IEEE 802.21, (May 2004).
Gupta, "IEEE P802.21 Media Independent Handover Service Draft Technical Requirements", 21-04-0087-01-0000, Total p. 8, (Jul. 13, 2004).
Gupta, "IEEE P802.21 Media Independent Handover Service Draft Technical Requirements", 21-04-0087-00-0000, Version 1, (Jul. 12, 2004).
Gupta, "IEEE P802.21 Media Independent Handover Service Draft Technical Requirements", 21-04-0087-00-0000, Version 2, (Jul. 12, 2004).
Gupta, "IEEE P802.21 Media Independent Handover Service Draft Technical Requirements", 21-04-0087-01-0000, Total p. 9, (Jul. 13, 2004).
Gupta, "IEEE P802.21 Media Independent Handover Service Draft Technical Requirements", 21-04-0087-04-0000, (Jul. 15, 2004).

(56) References Cited

OTHER PUBLICATIONS

Gupta, "IEEE P802.21 Media Independent Handover Service Draft Technical Requirements", 21-04-0087-05-0000, (Jul. 20, 2004).
Gupta, "IEEE P802.21 Media Independent Handover Service Draft Technical Requirements", 21-04-0087-06-0000, Version 1, (Jul. 27, 2004).
Gupta, "IEEE P802.21 Media Independent Handover Service Draft Technical Requirements", 21-04-0087-06-0000, Version 2, (Jul. 27, 2004).
Gupta, "IEEE P802.21 Media Independent Handover Service Draft Technical Requirements", 21-04-0087-07-0000, (Aug. 5, 2004).
Gupta, "IEEE P802.21 Media Independent Handover Service Draft Technical Requirements", 21-04-0087-08-0000, Version 1, Total p. 10, (Aug. 9, 2004).
Gupta, "IEEE P802.21 Media Independent Handover Service Draft Technical Requirements", 21-04-0087-08-0000, Version 2, Total p. 11, (Aug. 9, 2004).
Gupta, "IEEE P802.21 Media Independent Handover Service Draft Technical Requirements", 21-04-0087-08-0000, (Aug. 9, 2004).
Gupta, "IEEE P802.21 Media Independent Handover Service Draft Technical Requirements", 21-04-0087-09-0000, (Aug. 17, 2004).
Gupta, "IEEE P802.21 Media Independent Handover Service Draft Technical Requirements", 21-04-0087-11-0000, (Sep. 21, 2004).
Gupta, "IEEE P802.21 Media Independent Handover Service Draft Technical Requirements", 21-04-0087-12-0000, (Sep. 21, 2004).
Gupta, "Mapping Primitives to Communication Reference Points", IEEE 802.21 Media Independent Handover Services, 21-06-0512-00-0000-MappingToRefPoints, (Jan. 2006).
Gupta, "Media Independent Handover", IEEE 802.21 Media Independent Handover Services, 21-06-0362-02-0000-Section5_Changes, (Jan. 2006).
Gupta, "Media Independent Neighbor Reports", IEEE 802.21 Media Independent Handover, 21-05-0363-00-0000-Neighbor_Reports, (Sep. 2005).
Gupta, "Requirements and Suggested Amendments for IEEE 802.11", IEEE 802.21 Media Independent Handover Services, 21-05-0340-00-0000-Requirements_Amendments_802_11, (Aug. 2005).
Gupta, "Requirements and Suggested Amendments for IEEE 802.11", IEEE 802.21 Media Independent Handover Services, 21-05-0340-00-0000-Requirements_Amendments_802.11, Version 2, (Sep. 2005).
Gupta, "Requirements and Suggested Amendments for IEEE 802.11", IEEE 802.21 Media Independent Handover Services, 21-05-0340-00-0000-Requirements_Amendments$_{13}$ 802.11, Version 1, (Sep. 2005).
Gupta, "Requirements and Suggested Amendments for IEEE 802.11", IEEE 802.21 Media Independent Handover Services, 21-05-0350-08-0000-Requirements_Amendments_802_11, (Jan. 2006).
Gupta, "Requirements and Suggested Amendments for IEEE 802.11", IEEE 802.21 Media Independent Handover Services, 21-05-0350-09-0000-Requirements_Amendments_802_11, (Jan. 2006).
Gupta, "Requirements and Suggested Amendments for IEEE 802.16", IEEE 802.21 Media Independent Handover Services, 21-05-0335-00-0000-Requirements_Amendments_802_16, (Aug. 2005).
Gupta, "Requirements and Suggested Amendments for IEEE 802.16", IEEE 802.21 Media Independent Handover Services, 21-05-0335-01-0000-Requirements_Amendments_802_16, (Aug. 2005).
Gupta, "Steps in Handoffs and Use Cases", IEEE 802.21, (May 2004).
Gupta, "Steps in L2 and L3 Handoffs", IEEE P802 Handoff ECSG, (Jan. 2004).
Gupta, "Teleconference Meeting Minutes", IEEE P802.21, Media Independent Handover Mechanisms, 21-04-00yy-00-0021, (Jun. 15, 2004).
Gupta, "Teleconference Meeting Minutes", IEEE P802.21, Media Independent Handover Mechanisms, 21-04-0072-00-0000, (Jun. 15, 2004).
Gupta, "Teleconference Meeting Minutes", IEEE P802.21, Media Independent Handover Mechanisms, 21-04-0073-00-0000, (Jun. 29, 2004).
Halliop et al., "XML Framework for Component Communication", IEEE 802.21 Media Independent Handover, 21-05-0305-00-0000, (Jul. 19, 2005).
Hoghooghi et al., "Media Independent Handover Functions and Services Specification", IEEE 802.21 MIHO, (Mar. 14, 2004).
Hoghooghi et al., "Media Independent Handover", IEEE 802.21 Media Independent Handover Services, (Mar. 2005).
Hoghooghi et al., "Optimal Beacon & Architecture for MIH", IEEE 802.21 Media Independent Handover, 21-04-0164-02-0021, (Jan. 10, 2005).
Hoghooghi et al., "Optimal Beacon & Architecture for MIH", IEEE 802.21 Media Independent Handover, IEEE802.21-05-0164-04-0000, (Mar. 4, 2005).
Hong et al., "Handover Scenarios and Requirements", IEEE 802.21-04/xxxr0, (May 12, 2004).
Hunter, "Liaison Report—802.11 Work Related to 802.21", IEEE 802.21 Media Independent Handover, 21-05-0381-00-0000, (Sep. 22, 2005).
Hunter, "Liaison Report—802.11 Work Related to 802.21", IEEE 802.21 Media Independent Handover, 21-05-0381-01-0000, (Sep. 22, 2005).
Hunter, "Liaison Report IEEE 802.11 Work Related to 802.21", IEEE 802.21-05/0260r0, (Mar. 2005).
IEEE P802.21/D00.01, Draft IEEE Standard for Local and Metropolitan Area Networks: Media Independent Handover Services, Jul. 2005.
IEEE Standard for Local and Metropolitan area networks, Part 16: Air Interface for Fixed Broadband Wireless Access Systems, IEEE Std. 802.16-2004, XP002460689, pp. 3,4, and 16, (Jun. 24, 2004).
IEEE Wireless LAN Edition, A Compilation Based on IEEE Std™—1999 (R2003) and Its Amendments.
Jee et al., "Amendment for MIH_Network_Address_Information (6.2.5.3, 7.4.13)", IEEE 802.21 Media Independent Handover, 21-05-0288.00-0000, (Jul. 2005).
Jee et al., "Amendment of the MIH Protocol Format", IEEE 802.21 Media Independent Handover Services, 21-05-0409-00-0000.doc, (Nov. 5, 2005).
Jee et al., "Amendments of MIH Handover Prepare Primitive", IEEE 802.21 MIHS, 21-06-068-00-0000, (Jan. 9, 2006).
Jee et al., "Link Layer Events in IEEE 802.16e (Section 6.1.6)", IEEE 802.21 Media Independent Handover, 21-05-0xxx-00-0000, (Jul. 2005).
Jeon et al., "Amendments of MIH Configure Primitive", IEEE 802.21 MIHS, 21-06-0491-00-0000-MIH_Configure_jeon.doc, (Jan. 9, 2006).
Jeon et al., "Amendments of MIH Configure Primitive", IEEE 802.21 MIHS, 21-06-0491-01-0000-MIH_Configure_jeon.doc, (Jan. 9, 2006).
Johnston et al., "Tentative Minutes of the IEEE P802.21 Handoff Executive Committee Study Group", IEEE P802 Wired and Wireless LANs Handoff, 00-04-00XX-00-0000, (Mar. 17, 2004).
Johnston et al., "Tentative Minutes of the IEEE P802.21 Handoff Executive Committee Study Group", IEEE P802 Wired and Wireless LANs Handoff, 00-04-00XX-00-0000, (Mar. 18, 2004).
Johnston et al., "Tentative Minutes of the IEEE P802.21 Working Group", IEEE P802 Wired and Wireless LANs Handoff, 00-04-00XX-00-0000, (Mar. 16, 2004).
Johnston, "802 Handoff ECSG 802.16 Closing Plenary Report", Handoff_ECSG_802.16_Closing_Plenary_Report, (Nov. 2003).
Johnston, "802 Handoff ECSG EC Opening Plenary Report", 802_Handoff_EC_Opening_Plenary_Report, (Nov. 2003).
Johnston, "802 Handoff ECSG EC Opening Plenary Report", 802_Handoff_EC_Opening_Plenary_Report r2, (Nov. 2003).
Johnston, "802 Handoff ECSG Nov. 2003 Opening Plenary Report", 802_Opening_Plenary_Handoff r1, (Nov. 2003).
Johnston, "802.11k MIB Access Harmonization", IEEE 802.21, (May 2004).
Johnston, "802.16 Liaison to 802.21 Jul. 2004, Portland, OR", (Jul. 2004).

(56) References Cited

OTHER PUBLICATIONS

Johnston, "802.21 L2 Services for Handover Optimization", 802.21_IETF_DNA_r1, (Mar. 2004).
Johnston, "802.21, L2 Triggers a Strawman Proposal", 802.21_IETF_Mobopts_r1, (Mar. 2004).
Johnston, "Example Service Interface Primitive Definitions", 21-04-00xx-01-0021-service-primitives.doc, (May 12, 2004).
Johnston, "IEEE 802 Handoff ECSG Chair's Introduction", 802_Handoff_Opening_Notes_r1, (Nov. 2003).
Johnston, "IEEE 802 Handoff ECSG Chair's Introduction", 802_Handoff_Opening_Notes_r1, (Jan. 2004).
Johnston, "IEEE 802 Handoff ECSG L2 Triggers", L2_Triggers_dj_r1, (Jan. 2004).
Johnston, "IEEE 802 Handoff ECSG Standard Development Plan", 802_Handoff_std_dev_plan_r1, (Jan. 2004).
Johnston, "IEEE 802.21 Session #1 Opening Plenary Notes", 802.21_Opening_Notes_r1, (Mar. 2004).
Johnston, "Invariants in Proposed Drafts", IEEE 802.21 Media Independent Handover, 21-04-0257-00-0000-draft_invariants, (Mar. 16, 2004).
Johnston, "Overview of 802.21 Stack Model", 21-04-00xx-01-0021-Overview_stack_text.doc, (Jul. 12, 2004).
Johnston, "802 Handoff Call for Interest—An Expression of Interest," IEEE 802-03/xxxrl, (Mar. 2003).
Joint Harmonized Contribution, "Media Independent Handover", IEEE 802.21 Media Independent Handover Services, 21-05-xxxx-00-0000-One_Proposal_Draft_Text, (May 2005).
Joint Harmonized Contribution, "Media Independent Handover", IEEE 802.21 Media Independent Handover Services, 21-05-0240-01-0000-Joint_Harmonized_MIH_Proposal_Draft_Text, (May 2005).
Joint Harmonized Contribution, "Media Independent Handover", IEEE 802.21 Media Independent Handover Services, (May 2005).
Kim et al., "Amendment of MIH Capability Discover in Section 7.4.1", IEEE 802.21 Media Independent Handover Services, 21-06-0488-00-0000.doc, (Jan. 9, 2006).
Kim et al., "Amendments to the MIH Capability Discovery", IEEE 802.21 Media Independent Handover, IEEE802.21-05-0293-00-0000, (Jul. 11, 2005).
Kim et al., "M_SAP & C_SAP Update Based on the Accepted Requirement and Amendment Document of 802.16", IEEE 802.21 Media Independent Handover Services, (Jan. 2006).
Kim et al., "Proposed Modification of the MIH Capability Discovery", IEEE 802.21 Media Independent Handover Services, 21-05-xxxx-00-0000.doc, (Sep. 13, 2005).
Kim et al., "Proposed Modification of the MIH Capability Discovery", IEEE 802.21 Media Independent Handover Services, 21-05-0373-01-0000.doc, (Sep. 13, 2005).
Kim et al., "Proposed Modification of the MIH Capability Discovery", IEEE 802.21 Media Independent Handover Services, 21-05-0373-02-0000.doc, (Sep. 13, 2005).
Kim et al., "Service Category Allocation to MIH Primitives and Link Primitives", IEEE 802.21 Media Independent Handover, 21-06-0487-00-0000.doc, (Jan. 9, 2006).
Kim et al., "Suggested Amendments to Draft 802.21 Specification", IEEE 802.21 MIHO, 21-05-0304-00-0000-Suggested_Amendments.doc, (Jul. 11, 2005).
Kim et al., "Suggested Amendments", IEEE 802.21 MIHO, 21-05-0359-00-0000-Suggested Amendments.doc, (Sep. 13, 2005).
Kim, "802.16 to 802.21 Liaison Report", IEEE 802.21 Media Independent Handover, 21-04-0191-00-0021, (Mar. 17, 2005).
Kim, "802.16 to 802.21 Liaison Report", IEEE 802.21 Media Independent Handover, 21-05-0259-01-0000-802_16_Liason_Mar05, (Mar. 17, 2005).
Kim, "802.16 to 802.21 Liaison Report", IEEE 802.21 Media Independent Handover, 21-05-0274-00-0000-802_Liaison_Mar05, (Mar. 17, 2005).
Koh et al., "Handoff between Different Network Interfaces," IEEE 802.21 Media Independent Handover, 21-04-0132-00-0000 (Sep. 5, 2004).
Koora et al., "Change in Event Flow Figures", IEEE 802.21 Media Independent Handover, 21-06-0482-00-0000, (Jan. 9, 2006).
Koora et al., "Media Independent Handover Function—Frame Header Contents", IEEE 802.21 Media Independent Handover, Version 3, Total p. 18, (Jan. 15, 2006).
Koora et al., "Media Independent Handover Function—Frame Header Contents", IEEE 802.21 Media Independent Handover, Version 1, Total p. 18, (Jan. 15, 2006).
Koora et al., "Media Independent Handover Function—Frame Header Contents", IEEE 802.21 Media Independent Handover, Version 2, Total p. 16, (Jan. 15, 2006).
Kuroda et al., "L2 Trigger Implementation Examples on MIRAI-SF Simulator—A Candidate for 802.21 Evaluation Platform", Version 2, Total p. 5, (May 2004).
Kuroda et al., "L2 Trigger Implementation Examples on MIRAI-SF Simulator—A Candidate for 802.21 Evaluation Platform", Version 1, Total p. 6, (May 2004).
Lee et al., "An Strategy for Interworking between WLAN and CDMA 2000", IEEE 802.11-00/xxx, (Nov. 2003).
Lee et al., "The Strategy for Interworking between WLAN and CDMA 2000", IEEE 802.11-00/xxx, (Nov. 10, 2003).
Lin, "IEEE P802 Handoff ECSG, Handoff for Multi-interface 802 Mobile Devices," (May 12, 2003).
Liu et al., "Considerations Regarding L2&L3 Schemes in 802.3/802.11 Handover", 802.21_wired_wireless_LAN_Handover_r0, (May 6, 2004).
Liu et al., "Handover Scenarios and Use Cases between 802.16 and 802.11", 21-04-0098-00-0000, (Jul. 7, 2004).
Liu et al., "Handover Scenarios and Use Cases between 802.16 and 802.11", IEEE 802.21 Media Independent Handover, 21-04-0098-00-0000, (Jul. 13, 2004).
Liu et al., "IEEE P802.21 Media Independent Handover Service Scenarios of Handover between IEEE 802.3 and 802.11", 21-04/-00xx-0021-802.3_802.11-Scenarios, (May 13, 2004).
Liu et al., "Initial Proposal to IEEE 802.21 from Samsung", IEEE 802.21 Media Independent Handover Services, (Jan. 10, 2005).
Liu et al., "Interaction between L2 and Upper Layers in IEEE 802.21", 802.21_L2_Upper_Layer_Interaction_r1, (Mar. 4, 2004).
Liu et al., "Neighbor Information Considerations in Heterogeneous Handovers", IEEE 802.21 Media Independent Handover, 21-06-0489-01-0000-MIH_Neighbor_Information, (Jan. 2006).
Liu, "IEEE 802.21 Media Independent Handover Service Sub-Sections for 802.21 Technical Requirements", V.0.0, 21-04-00xx-00-0021, (May 13, 2004).
Liu, "Introduction to L3 Movement Detection and L3 Link Identifier", 21-04-00xx-00-0021-Movement_Detection_LinkID, (May 7, 2004).
Liu, "Neighbor Information Considerations in Heterogeneous Handovers", IEEE 802.21 Media Independent Handover, 21-06-0489-00-0000-MIH_Neighbor_Information, (Jan. 2006).
Mahalingam et al., "Media Independent Handover", IEEE 802.21 Media Independent Handover Services, (Mar. 2005).
Mani, "Application Consideration in Handover", IEEE 802.21 Media Independent Handover, 21-04-0118-00-0000, (Jul. 15, 2004).
McCann, "IEEE 802.11 Wireless Interworking with External Networks (WIEN) Study Group", IEEE 802.21-04/107r0, (Jul. 2004).
McCann, "IEEE 802.11 Wireless Interworking with External Networks (WIEN) Study Group", IEEE 802.21-04/xxxr0, (May 2004).
McCann, "Justification for Interworking Study Group", IEEE P802.11 Wireless LANs, IEEE 802.11-03/993r0, (Jan. 7, 2004).
McCann, "Liaison to IETF from IEEE 802.11 and IEEE 802.21 Review of IETF IAB Draft Document, Mar. 2005", IEEE P802.11 Wireless LANs, IEEE 802.11-05/0283r0, (Mar. 17, 2005).
McCann, "Liaison to IETF from IEEE 802.11 and IEEE 802.21 Review of IEFT IAB Draft Document, Mar. 2005", IEEE P802.11 Wireless LANs, IEEE 802.11-05/0283r32, (Apr. 5, 2005).
McCann, "Liaison to IETF from IEEE 802.11 and IEEE 802.21 Review of IETF IAB Draft Document, Mar. 2005", IEEE P802.11 Wireless LANs, IEEE 802.11-05/0283r1, (Mar. 17, 2005).
McCann, "Liaison to IETF from IEEE 802.11 and IEEE 802.21 Review of IETF IAB Draft Document, Mar. 2005", IEEE P802.11 Wireless LANs, IEEE 802.11-05/0283r12, Version 1, Marked up, (Mar. 31, 2005).

(56) References Cited

OTHER PUBLICATIONS

McCann, "Liaison to IETF from IEEE 802.11 and IEEE 802.21 Review of IEFT IAB Draft Document, Mar. 2005", IEEE P802.11 Wireless LANs, IEEE 802.11-05/0283r12, Version 2, Clean, (Mar. 31, 2005).
McCann, "WLAN—Cellular Interworking", IEEE P802 Handoff ECSG, (Nov. 2003).
Mitani et al., "Unified L2 Abstractions for L3-Driven Fast Handover—Media Independent L2 Triggers from the Perspective of IP Layer—", Keio University, (Mar. 2005).
Mitsubishi Electric Corporation, "A Proposal for Supporting Terminal Mobility at Layer 2", (Jan. 2004).
Mitsubishi Electric Corporation, "Possible Solutions for Fast Handoff—Feasibility of L2 Trigger for FMIP and L2 Mobility Support", (Jan. 2004).
Montavont et al., "Effects of Router Configuration and Link Layer Trigger Parameters on Handover Performance", IEEE 802.21 MIHO, 21-21-05-0358-00-0000, (Sep. 15, 2005).
Network Working Group, "Architectural Implications of Link Indications", Internet-Draft, (Jan. 10, 2005).
Njedjou, "Proposal for the 802.21 Solution", IEEE 802.21 Media Independent Handover, (Nov. 8, 2004).
Ohba et al., "Analysis on Identifiers", IEEE 802.21 Media Independent Handover, 21-06-0469-00-0000, (Jan. 9, 2006).
Ohba et al., "Comments on Information Service Sections", IEEE 802.21 Media Independent Handover, 21-05-0346-00-0000, (Sep. 20, 2005).
Ohba et al., "Integration of XML and TLV", IEEE 802.21 Media Independent Handover, 21-05-0407-03-0000, (Jan. 9, 2006).
Ohba et al., "Proposal on Revised Information Service Primitives", IEEE 802.21 MIHO, 21-06-0461-00-0000-IS_Primitives, (Jan. 9, 2006).
Ohba et al., "Reference Model and Use-Cases for 802.21 Information Service", IEEE 802.21 Media Independent Handover, 1-05-0336-00-0000, (Jul. 2005).
Ohba et al., "Reference Model and Use-Cases for 802.21 Information Service", IEEE 802.21 Media Independent Handover, 21-05-0336-01-0000, (Aug. 2005).
Ohba et al., "Revised Basic Schema", IEEE 802.21 MIHO, 21-06-0460-00-0000-Basic_Schema, (Jan. 9, 2006).
Ohba et al., "Supplement of D00-02_Ohba_Yoshihiro.USR", IEEE 802.21 MIHO, 21-05-0346-00-0000_Supplement_D00_02_Ohba_Yoshihiro.doc, (Sep. 14, 2005).
Olvera et al., "Media Independent Handover—Media Specific Link Threshold Parameter Survey", IEEE 802.21 Media Independent Handover, 21-06-0493-00-0000, (Jan. 9, 2006).
Olvera et al., "Media Independent Handover—Media Specific Link Threshold Parameter Survey", IEEE 802.21 Media Independent Handover, 21-06-0493-01-0000, (Jan. 9, 2006).
Olvera et al., "Proposed 802.21 Presentation for 3GPP", IEEE 802.21 Media Independent Handover, 21-05-0300-03-0000, (Aug. 11, 2005).
Olvera et al., "Proposed 802.21 Presentation for 3GPP", IEEE 802.21 Media Independent Handover, 21-05-0300-05-0000, (Aug. 18, 2005).
Olvera et al., "Proposed 802.21 Presentation for 3GPP", IEEE 802.21 Media Independent Handover, 21-05-0300-06-0000, (Aug. 25, 2005).
Olvera et al., "Proposed 802.21 Presentation for 3GPP", IEEE 802.21 Media Independent Handover, 21-05-0300-07-0000, (Sep. 1, 2005).
Olvera et al., "VCC Brief Introduction", IEEE 802.21 Media Independent Handover, 21-07-0364-00-0000, (Sep. 18, 2005).
Olvera et al., "VCC Brief Introduction", IEEE 802.21 Media Independent Handover, 21-07-0364-01-0000, (Sep. 21, 2005).
Olvera, "Media Independent Handover Functions and Services Specification", IEEE 802.21 MIHO, 21-06-0425-01-0000-InterDigital3GPP/3GPP/3GPP2 Amendments, (Jan. 18, 2006).
Olvera, "Media Independent Handover Functions and Services Specification", IEEE 802.21 MIHO, 21-06-0494-00-0000-InterDigital3GPP/3GPP/3GPP2 Amendments, (Jan. 9, 2006).
Olvera, "Media Independent Handover Functions and Services Specification", IEEE 802.21 MIHO, 21-06-0495-00-0000-InterDigitalCommandUpdates, (Jan. 9, 2006)
Olvera, "Media Independent Handover Functions and Services Specification", IEEE 802.21 MIHO, 21-05-0495-01-0000-InterDigitalCommandUpdates, (Jan. 9, 2006).
Park et al., "Information for IP Address Configuration Method", IEEE 802.21 Media Independent Handover, 21-06-0511-00-0000-indication-ipaddress-conf, (Jan. 15, 2006).
Park et al., "Information for IP Address Configuration Method", IEEE 802.21 Media Independent Handover, 21-06-0511-01-0000-indication-ipaddress-conf, (Jan. 15, 2006).
Park et al., "Subnet Change Indication", IEEE 802.21 Media Independent Handover, 21-06-0509-00-0000-subnet-change-indication, (Jan. 15, 2006).
Park, "Access Router Identifier (ARID) for Supporting L3 Mobility", IEEE 802.21 Media Independent Handover, 21-04-0078-00-0000, (Jul. 14, 2004).
Park, "Access Router Identifier (ARID) for Supporting L3 Mobility", IEEE P802.21 WIEN, (Jul. 2004).
Park, "Awareness of the Handover to be Distinguished from a L2 or L3", IEEE P802.21 Handoff, Total p. 8, (Mar. 2004).
Park, "Awareness of the Handover to be Distinguished from L2 or L3", IEEE P802.21 Handoff, Total p. 11, (Mar. 2004).
Péresse et al., "Contribution to Draft Initial Standard: New Event, Command and IS Primitives—Terminal Information Elements", IEEE 802.21 Media Independent Handover, 21-05-0372-00-0000, (Sep. 14, 2005).
Peresse et al., "MIH Information Elements for Terminals", IEEE 802.21, (Sep. 14, 2005).
Peresse et al., "MIH Link Handover Complete Event Definition", IEEE 802.21 Media Independent Handover Services, 21-06-0465-00-0000-MIH_Link_Handover_Complete, (Jan. 9, 2006).
Peresse et al., "MIH Link Parameter Report Primitive", IEEE 802.21 Media Independent Handover Services, 21-06-0466-00-0000-MIH_Link_Parameter_Report, (Jan. 9, 2006).
Peresse et al., "New Events, Commands, and Information Primitives", IEEE 802.21, (Sep. 14, 2005).
Puthenkulam et al., "802.16g Scope and Architectural Considerations," XP002460688, pp. 1-12, (Aug. 29, 2004).
Rajkumar et al., "IEEE P802 Media Independent Handover Services Tentative Minutes of the IEEE P802.21 Working Group", (Sep. 15, 2004).
Rajkumar et al., "IEEE P802 Media Independent Handover Services Tentative Minutes of the IEEE P802.21 Wroking Group", 21-04-00xx-00-0000, (Sep. 16, 2004).
Rajkumar et al., "IEEE P802 Media Independent Handover Services Tentative Minutes of the IEEE P802.21 Working Group", 21-04-00xx-00-0000, (Jul. 13, 2004).
Rajkumar et al., "IEEE P802 Media Independent Handover Services Tentative Minutes of the IEEE P802.21 Working Group", 21-04-00xx-00-0000, (Jul. 14, 2004).
Rajkumar et al., "IEEE P802 Media Independent Handover Services Tentative Minutes of the IEEE P802.21 Working Group", 21-04-00xx-00-0000, (Jul. 15, 2004).
Rajkumar et al., "IEEE P802 Media Independent Handover Services Teleconference Meeting Minutes of the IEEE P802.21 Working Group", 21-04-00xx-00-0000, (Jul. 27, 2004).
Rajkumar et al., "IEEE P802 Media Independent Handover Services Teleconference Meeting Minutes of the IEEE P802.21 Working Group", 21-04-00xx-00-0000, (Aug. 3, 2004).
Rajkumar et al., "IEEE P802 Media Independent Handover Services Teleconference Meeting Minutes of the IEEE P802.21 Working Group", 21-04-00xx-00-0000, (Aug. 9, 2004).
Rajkumar et al., "IEEE P802 Media Independent Handover Services Teleconference Meeting Minutes of the IEEE P802.21 Working Group", 21-04-00xx-00-0000, (Aug. 12, 2004).
Rajkumar et al., "IEEE P802 Media Independent Handover Services Teleconference Meeting Minutes of the IEEE P802.21 Working Group", 21-04-00xx-00-0000, (Aug. 19, 2004).
Rajkumar et al., "IEEE P802 Media Independent Handover Services Teleconference Meeting Minutes of the IEEE P802.21 Working Group", 21-04-00xx-00-0000, (Aug. 25, 2004).

(56) References Cited

OTHER PUBLICATIONS

Rajkumar et al., "IEEE P802 Media Independent Handover Services Tentative Minutes of the IEEE P802.21 Working Group", 21-04-01xx-00-0000, (Nov. 15, 2004).
Rajkumar et al., "IEEE P802 Media Independent Handover Services Tentative Minutes of the IEEE P802.21 Working Group", 21-04-01xx-00-0000, (Nov. 16, 2004).
Rajkumar et al., "IEEE P802 Media Independent Handover Services Tentative Minutes of the IEEE P802.21 Working Group", 21-04-01xx-00-0000, (Nov. 17, 2004).
Rajkumar et al., "IEEE P802 Media Independent Handover Services Tentative Minutes of the IEEE P802.21 Working Group", 21-04-01xx-00-0000, (Nov. 18, 2004).
Rajkumar et al., "IEEE P802 Media Independent Handover Services Teleconference Meeting Minutes of the IEEE P802.21 Working Group", 21-04-01xx-00-0000, (Nov. 30, 2004).
Rajkumar et al., "IEEE P802 Media Independent Handover Services Teleconference Meeting Minutes of the IEEE P802.21 Working Group", 21-04-0201-00-0000, (Dec. 7, 2004).
Rajkumar et al., "IEEE P802 Media Independent Handover Services Tentative Minutes of the IEEE P802.21 Working Group", 21-05-00xx-00-0000, (Jan. 17, 2005).
Rajkumar et al., "IEEE P802 Media Independent Handover Services Tentative Minutes of the IEEE P802.21 Working Group", 21-05-00xx-00-0000, (Jan. 18, 2005).
Rajkumar et al., "IEEE P802 Media Independent Handover Services Tentative Minutes of the IEEE P802.21 Working Group", 21-05-00xx-00-0000, (Jan. 19, 2005).
Rajkumar et al., "IEEE P802 Media Independent Handover Servies Tentative Minutes of the IEEE P802.21 Working Group", 21-05-00xx-00-0000, (Jan. 20, 2005).
Rajkumar et al., "IEEE P802 Media Independent Handover Services Tentative Minutes of the IEEE P802.21 Working Group", 21-04-00xx-00-0000, (Sep. 14, 2004).
Rajkumar, "802.21 Higher Layer Requirements for IETF", IEEE 802.21 Media Independent Handover, 21-05-0330-00-0000, (Aug. 2, 2005).
Rajkumar, "IEEE 802.21 Session #2 Opening Session", 21-04-00xx-00-0000-session2_opening_notes.ppt, (May 2004).
Rajkumar, "Joint IEEE 802.21 and 802.11TGn Meeting", 21-04-0082-00-0000-Joint_802_21_TGn.ppt, (Jul. 2004).
Rajkumar, "Joint IEEE 802.21, 802.11 TGn, and 802.11 TGs Meeting", 21-04-0082-00-0000-Joint_802_21_TGr_TGs.ppt, (Jul. 2004).
Rajkumar, "Media Independent Handover Services and Interoperability", 21-05-0238-00-0000, IETF 62, (Minneapolis, Mar. 7, 2005).
Rajkumar, "Media Independent Handover Services and Interoperability", 21-05-0239-00-0000, IETF 62, (Minneapolis, Mar. 8, 2005).
Regency et al., "Tentative Minutes of the IEEE P802 Handoff Executive Committee Study Group", IEEE P802 Wired and Wirelss LANs Handoff, 00-04-00XX-00-0000, (Jan. 13, 2004).
Regency et al., "Tentative Minutes of the IEEE P802.21 Working Group", IEEE P802 Media Independent Handover Services, 22-04-0069-00-0000, (May 11, 2004).
Regency et al., "Tentative Minutes of the IEEE P802.21 Working Group", IEEE P802 Media Independent Handover Services, 21-04-0069-01-0000, (May 11, 2004).
Regency et al., "Tentative Minutes of the IEEE P802.21 Working Group", IEEE P802 Media Independent Handover Services, 21-04-0069-02-0000, (May 11, 2004).
Regency et al., "Tentative Minutes of the IEEE P802.21 Working Group", IEEE P802 Media Independent Handover Services, 21-04-0070-00-0000, (May 12, 2004).
Regency et al., "Tentative Minutes of the IEEE P802.21 Working Group", IEEE P802 Media Independent Handover Services, 21-04-0070-01-0000, (May 12, 2004).
Regency et al., "Tentative Minutes of the IEEE P802.21 Working Group", IEEE P802 Media Independent Handover Services, 21-04-0071-00-0000, (May 13, 2004).
Regency et al., "Tentative Minutes of the IEEE P802.21 Working Group", IEEE P802 Media Independent Handover Services, 21-04-0070-02-0000, (May 12, 2004).
Regency et al., "Tentative Minutes of the IEEE P802.21 Working Group", IEEE P802 Media Independent Handover Services, 21-04-0071-02-0000, (May 13, 2004).
Regency et al., "Tentative Munites of the IEEE P802 Handoff Executive Committee Study Group", IEEE P802 Wired and Wireless LANs Handoff, 00-04-00XX-00-0000, (Jan. 14, 2004).
Rouil et al., "Comments on IEEE 802.21 Draft Text", IEEE 802.21 MIHO, 21-05-0289-00-0000-Comments on 802.21 Draft Text.doc, (Jul. 6, 2005).
Salminen, "Architecture of a Dynamic Heterogeneous Network System", 802.21 Seamless Media Independent Handover WG, (Anaheim, CA, May 11-13, 2004).
Shyy et al., "IEEE P802.21 Media Independent Handover Service Input for Draft Technical Requirements", V.0.0, IEEE802.21-04/00xx-00, (May 6, 2004).
Shyy, "Requirements for Seamless Handoff between WLAN and Cellular Networks", IEEE P802 Handoff ECSG, (Vancouver, Jan. 2004).
Shyy, "Seamless Handoff "Standards" between Wlan and Cellular Networks", IEEE P802 Handoff ECSG, (Vancouver, Jan. 2004).
Siemens AG, "Generic Authentication Transport (GST) Operation & Use", European Telecommunications Standards Institute, BRAN28d031r1, BRAN#28, (Sophia Antipolis, France, Apr. 11, 2002).
Siep, "Wireless Architecture Ad Hoc Meeting Notes", IEEE 802.21 Media Independent Handover, 21-05-0273-00-0000-Wirless_Architecture_Ad_Hoc_meeting_notes.ppt, (Mar. 19, 2005).
Singh et al., "CARD Protocol for 802.21 Information Service (IS)", IEEE 802.21 Media Independent Handover Services, 21-06-0470-00-0000-CARD_Protocol_for_Information_Service, (Jan. 2006).
Singh et al., "CARD Protocol for 802.21 Information Service", IEEE 802.21 Media Independent Handover, 21-05-0360-00-0000, (Sep. 21, 2005).
Singh et al., CARD Protocol for 802.21 Information Service, IEEE 802.21 Media Independent Handover, 21-05-0360-01-0000, (Sep. 21, 2005).
Singh et al., "Report on Potential Link Syn Events for IEEE 802.11r", IEEE 802.21 Media Independent Handover, 21-06-0471-00-0000, (Jan. 9, 2006).
Singh et al., "Report on Potential Link Syn Events for IEEE 802.11r", IEEE 802.21 Media Independent Handover, 21-06-0471-01-0000, (Jan. 2006).
Sreemanthula et al., "Commentary Attachments for Event and Command Updates", IEEE 802.21 Media Independent Handover, 21-06-0477-00-0000-Events_Commands_Updates, (Jan. 16, 2005).
Sreemanthula et al., "Commentary Attachments to Add Events for Commands", IEEE 802.21 Media Independent Handover, 21-06-0479-00-0000-Events-for-Commands, (Jan. 16, 2005).
Sreemanthula et al., "Network Controlled Network Selection and HO Scenarios", IEEE 802.21 Media Independent Handover, 21-05-0366-00-0000, (Sep. 2005).
Sreemanthula et al., "Network Controlled Network Selection and HO Scenarios", IEEE 802.21 Media Independent Handover, 21-05-0366-01-0000, (Sep. 2005).
Sreemanthula, "Capability Discovery Updates", IEEE 802.21 Media Independent Handover Services, 21-06-0478-00-0000-capability-discovery-update, (Jan. 16, 2005).
Taniuchi et al., "Introduction to 802.21 Information Service Using XML/RDF Technologies", IEEE 802.21 MIHO, 21-05-0347-00-0000-XML_IS_Introduction, (Sep. 14, 2004).
Taniuchi et al., "RDF Schema Update for 802.21 Baseline Document", IEEE 802.21 MIHO, (Jul. 11, 2005).
The Internet Society, "Media Independent Information Service (MIIS) and Its Higher Layer Transport Requirements", (2006).
Williams, "Cross Domain Trigger and Handover Talking Points", IEEE 802.21 Media Independent Handover, 21-04-0100-01-0021, (Jul. 13, 2004).

(56) References Cited

OTHER PUBLICATIONS

Williams, "Cross Domain Trigger and Handover Talking Points", IEEE 802.21 Media Independent Handover, 21-04-0100-02-0021, (Jul. 13, 2004).
Williams, "IEEE 802.21 Liaisons & Coordination", IEEE 802.21 Media Independent Handover, 21-04-00xx-00-0021, Total p. 10, (May 11, 2004).
Williams, "IEEE 802.21 Liaisons & Coordination", IEEE 802.21 Media Independent Handover, 21-04-00xx-00-0021, Total p. 11, (May 11, 2004).
Williams, "Trigger Transport Concepts", IEEE 802.21 Media Independent Handover, 21-04-00xx-00-0000, (Jul. 15, 2004).
Williams, "Possible MIH MAC abstractions and services," IEEE 802.21 Media Independent Handover, 21-04-0148-00-0000 (Sep. 15, 2004).
Wisely et al., "Handover Use Cases and Additional IEs", IEEE 802.21 Media Independent Handover, 21-06-0472-00-0000-Handover_Use_Cases_More_IEs, (Jan. 2006).
Wu et al., Intelligent Handoff for Mobile Wireless Internet, *Mobile Networks and Applications 6*, 2001, pp. 67-76.
Xie et al., "Definition and Enhancements to MIH Link Parameter Change Primitive", IEEE 802.21 Media Independent Handover, 21-06-0467-00-0000, (Jan. 9, 2006).
Xie et al., "Media Independent Handover", IEEE 802.21 Media Independent Handover Services, 21-05-0365-00-0000-communication_model_text, (Sep. 2005).
Xie et al., "Media Independent Handover", IEEE 802.21 Media Independent Handover Services, 1-05-0365-01-0000-communication_moel_text, (Sep. 2005).
Xie et al., "Media Independent Handover", IEEE 802.21 Media Independent Handover Services, 21-05-0365-02-0000-communication_model_text, (Sep. 2005).
Xie et al., "Two New Information Elements for Facilitating L3 Connectivity Setup Before a Handover", IEEE 802.21 Media Independent Handover, 21-06-0480-00-0000, (Jan. 9, 2006).
Yi, "MIH Power Event", IEEE 802.21 Media Independent Handover, 21-05-0456-00-0000, (Dec. 5, 2005).
"802 Handoff ECSG Criteria for Standards Development (Five Criteria)", Version 2, Total p. 4, (Nov. 2003)
Bhatt et al., "IEEE 802.21 Media Independent Handover Solution Proposal—Updated with Details (See Abstract Below)", IEEE 802-21 Media Independent Handover, 21-04-0170-00-0000, (Jan. 10, 2005).
Das et al., "Information Service (IS) Reference Model, Use Case Scenario and Higher Layer Requirements for 802.21 Information Service (IS)", IEEE 802.21 Media Independent Handover Services, 21-05-0348-00-0000-Higher_layer_Requirements_Information_Service, Version 1, Total p. 12, (Sep. 2005).
Feder et al., "IEEE P802.21 Media Independent Handover Service Draft Technical Requirements", 21-04-00xx-00-0021-Req_Sect_3_1&3_2.doc, (May 9, 2004).
Feder et al., "IEEE P802.21 Media Independent Handover Service Draft Technical Requirements", 21-04-00xx-00-0021-Req_Section1.doc, (May 9, 2004).
Gupta, "Requirements and Suggested Amendments for IEEE 802.11", IEEE 802.21 Media Independent Handover Services, 21-05-0340-00-0000-Requirements_Amendments_802.11, Version 1, (Sep. 2005).
IEEE Standard for Local and Metropolitan area networks, Part 16: Air Interface for Fixed Broadband Wireless Access Systems, IEEE Std. 802-16-2004, XP002460689, pp. 3,4, and 16, (Jun. 24, 2004).
Johnston, "802 Handoff Call for Interest—An Expression of Interest," IEEE 802-03/xxxr1, (Mar. 2003).
Kim et al., "Proposed Modification of the MIH Capability Discovery", IEEE 802.21 Media Independent Handover Services, 21-05-xxxx-00-0000.doc, (Sep. 13, 2005)
Kim, "802.16 to 802.21 Liaison Report", IEEE 802.21 Media Independent Handover, 21-05-0259-01-0000-802_16_Liaison_Mar05, (Mar. 17, 2005).

Liu et al., "Considerations Regarding L2&L3 Schemes in 802.3/802.11 Handover", 802.21_wired_wireles_LAN_Handover_r0, (May 6, 2004).
Liu et al., "IEEE P802.21 Media Independent Handover Service Scenarios of Handover between IEEE 802.3 and 802.11", 21-04/00xx-00-0021-802.3_802.11-Scenarios, (May 13, 2004).
McCann, "Liaison to IETF from IEEE 802.11 and IEEE 802.21 Review of IETF IAB Draft Document, Mar. 2005", IEEE P802.11 Wireless LANs, IEEE 802.11-05/0283r32, (Apr. 5, 2005).
McCann, "Liaison to IETF from IEEE 802.11 and IEEE 802.21 Review of IETF IAB Draft Document, Mar. 2005", IEEE P802.11 Wireless LANs, IEEE 802.11-05/0283r12, Version 2, Clean, (Mar. 31, 2005).
Olvera et al., "Media Independent Handover—Media Specific Link Threshold Parameter Survey", IEEE 802.21. Media Independent Handover, 21-06-0493-01-0000, (Jan. 9, 2006).
Olvera, "Media Independent Handover Functions and Services Specification", IEEE 802.21 MIHO, 21-06-0425-01-0000-InterDigital3GPPP/3GPP2 Amendments, (Jan. 18, 2006).
Olvera, "Media Independent Handover Functions and Services Specification", IEEE 802.21 MIHO, 21-06-0495-00-0000-InterDigitalCommandUpdates, (Jan. 9, 2006).
Rajkumar et al., "IEEE P802 Media Independent Handover Services Tentative Minutes of the IEEE P802.21 Working Group", 21-04-00xx-00-0000, (Sep. 16, 2004).
Rajkumar et al., "IEEE P802 Media Independent Handover Services Tentative Minutes of the IEEE P802.21 Working Group", 21-05-00xx-0000, (Jan. 17, 2005).
Rajkumar et al., "IEEE P802 Media Independent Handover Services Tentative Minutes of the IEEE P802.21 Working Group", 21-05-00xx-00-0000, (Jan. 20, 2005).
Rajkumar et al., "IEEE P802 Media Independent Handover Servies Tentative Minutes of the IEEE P802.21 Working Group", 21-04-00xx-00-0000, (Sep. 14, 2004).
Regency et al., "Tentative Minutes of the IEEE P802 Handoff Executive Committee Study Group", IEEE P802 Wired and Wireless LANs Handoff, 00-04-00XX-00-0000, (Jan. 13, 2004).
Siep, "Wireless Architecture Ad Hoc Meeting Notes", IEEE 802.21 Media Independent Handover, 21-05-0273-00-0000-Wireless_Architecture_Ad_Hoc_meeting_notes.ppt, (Mar. 19, 2005).
Taniuchi et al., "Introduction to 802.21 Information Service Using XML/RDF Technologies", IEEE 802.21 MIHO, 21-05-0347-00-0000-XML_IS_Introduction, (Sep. 14, 2005).
ES-CS Adhoc Group, "Higher Layer Requirements for Event and Command Services", IEEE 802.21 Media Independent Handover, 21-06-04xx-00-0000-ES-CS-HL-Req.doc, (Jan. 16, 2005).
Gupta et al., "Information Elements", IEEE 802.21 Media Independent Handover Services, 21-06-0401-03-0000-Information_Information_Elements (Jan. 2006).
Gupta, "Requirements and Suggested Amendments for IEEE 802.11", IEEE 802.21 Media Independent Handover Services, 21-05-0350-09-0000-Requirements_Amendments_802_11, (Jan. 2006)
Kim et al., "Suggested Amendments to Draft 802.21 Specification", IEEE 802.21 MIHO, 21-05-0304-00-0000-Suggested_Amendments.dco, (Jul. 11, 2005).
Liu et al., "Considerations Regarding L2&L3 Schemes in 802.3/802.11 Handover", 802.21_wired_wireless_LAN_Handover_r0 (May 6, (2004).
Olvera, "Media Independent Handover Functions and Services Specification", IEEE 802.21 MIHO, 21-06-0425-01-0000-InterDigital3GPP/3GPP2 Amendments, (Jan. 18, 2006).
Peresse et al., "Contribution to Draft Initial Standard: New Event, Command and IS Primitives—Terminal Information Elements", IEEE 802.21 Media Independent Handover, 21-05-0372-00-0000, (Sep. 14, 2005).
Rajkumar, "802.21 Higher Layer Requirements for IEFT", IEEE 802.21 Media Independent Handover, 21-05-0330-00-0000, (Aug. 2, 2005).

(56) References Cited

OTHER PUBLICATIONS

Regency et al., "Tentative Minutes of the IEEE P802.21 Working Group", IEEE P802 Media Independent Handover Services, 21-04-0071-00-0000, (May 12, 2004).
Regency et al., "Tentative Minutes of the IEEE P802.21 Working Group", IEEE P802 Media Independent Handover Services, 21-04-0070-02-0000, (May 13, 2004).
Shyy et al., "IEEE P802.21 Media Independent Handover Service Input for Draft Technical Requirements", V.00., IEEE802.21-04/00xx-00, (May 6, 2004).
Singh et al., "CARD Protocol for 802.21 Information Service (IS)", IEEE 802.21 Media Independent Handover Services, 21-06-0470-00-0000-CARD_Protocol_for_Information_Services, (Jan. 2006).

\* cited by examiner

WIRELESS METROPOLITAN AREA NETWORK ARCHITECTURE FOR MANAGING NETWORK RESOURCES AND MOBILITY

CROSS REFERENCE TO RELATED APPLICATIONS

This application is a continuation of U.S. patent application Ser. No. 11/261,336, filed Oct. 28, 2005, now U.S. Pat. No. 7,848,291, issued Dec. 7, 2010, which claims the benefit of U.S. Provisional Patent Application No. 60/625,628, filed Nov. 5, 2004, which is incorporated by reference as if fully set forth herein.

FIELD OF THE INVENTION

The present invention relates generally to wireless metropolitan area networks (WMANs), and more particularly, to an architecture for managing network resources and mobility in a WMAN.

BACKGROUND

Wireless metropolitan area network (WMAN) standards have to define a network structure that provides the network equipment with procedures to enable management of network resources, mobility, and spectrum. This network architecture should allow the networks to perform seamless handover between different WMAN networks and harmonize the handover process with 802.21 for seamless mobility with other wireless networks (e.g., 802.11 wireless local area networks, cellular, etc.).

Current solutions do not define how WMAN network resources are managed and how users can handover seamlessly between various WMAN networks or from WMAN networks to different access technologies. There is a need to define reference models and network architectures for radio resource management (RRM) and mobility management between WMAN and heterogeneous access technologies.

SUMMARY

The present invention proposes an infrastructure to enable seamless mobility for WMAN networks and provide for management of spectrum and network resources. A network reference model is introduced where the radio resource management (RRM) and handover (HO) sublayer is introduced into the protocol stack. The network management plane is responsible for the RRM and HO management. Also, the invention proposes physical and logical network architecture options for network management.

A system for managing resources in a WMAN includes a control and data plane and a management plane. The control and data plane includes a service specific convergence sublayer, a MAC common part sublayer (CPS), and a physical sublayer. The management plane includes a service specific convergence sublayer management entity, a MAC CPS management entity, a RRM sublayer, a handover sublayer, a physical sublayer management entity, and a management service access point, through which the components of the management plane communicate with each other.

A system for managing handovers in a WMAN includes a mobile IP part; a handover sublayer, the handover sublayer being specific to a network type of the WMAN; a media independent handover (MIH) lower layer convergence function (LLCF), the LLCF being specific to a network type of the WMAN; a MIH handover function; and a MIH higher layer convergence function.

A system for managing resources in a WMAN includes a base station, a radio access gateway, a core network, and a MIH access gateway. The base station is configured to communicate with a station. The radio access gateway is configured to operate as a system management entity and to communicate with the base station. The core network communicates with the radio access gateway. The MIH access gateway is configured to perform media independent handovers and to communicate with the radio access gateway.

A system for managing resources in a WMAN includes a base station, an access gateway, and a core network. The base station is configured to communicate with a station. The access gateway communicates with the base station and includes a radio access gateway and a MIH access gateway. The MIH access gateway is configured to perform media independent handovers and to communicate with the radio access gateway. The core network communicates with the access gateway.

A system for managing resources in a WMAN includes a base station and a core network. The base station includes a MAC and physical layer device, a radio access gateway, and a MIH access gateway. The radio access gateway is configured to communicate with the MAC and physical layer device. The MIH access gateway is configured to perform media independent handovers and to communicate with the radio access gateway. The core network communicates with the base station.

DETAILED DESCRIPTION OF THE PREFERRED EMBODIMENTS

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention defines a generic architecture for WMAN equipment to allow for seamless mobility within a WMAN. Also, it provides for mobility between heterogeneous networks. Section 1 introduces the protocol reference model. The management plane concept is used to address mobility and network resource management. Section 2 shows the logical network architecture. Two new logical nodes are introduced, the System Management Entity (radio access gateway) and the Media Independent Handover (MIH) access gateway. Section 3 shows how the logical architecture can be mapped to different implementations.

1. WMAN Protocol Reference Model

Figure 1:
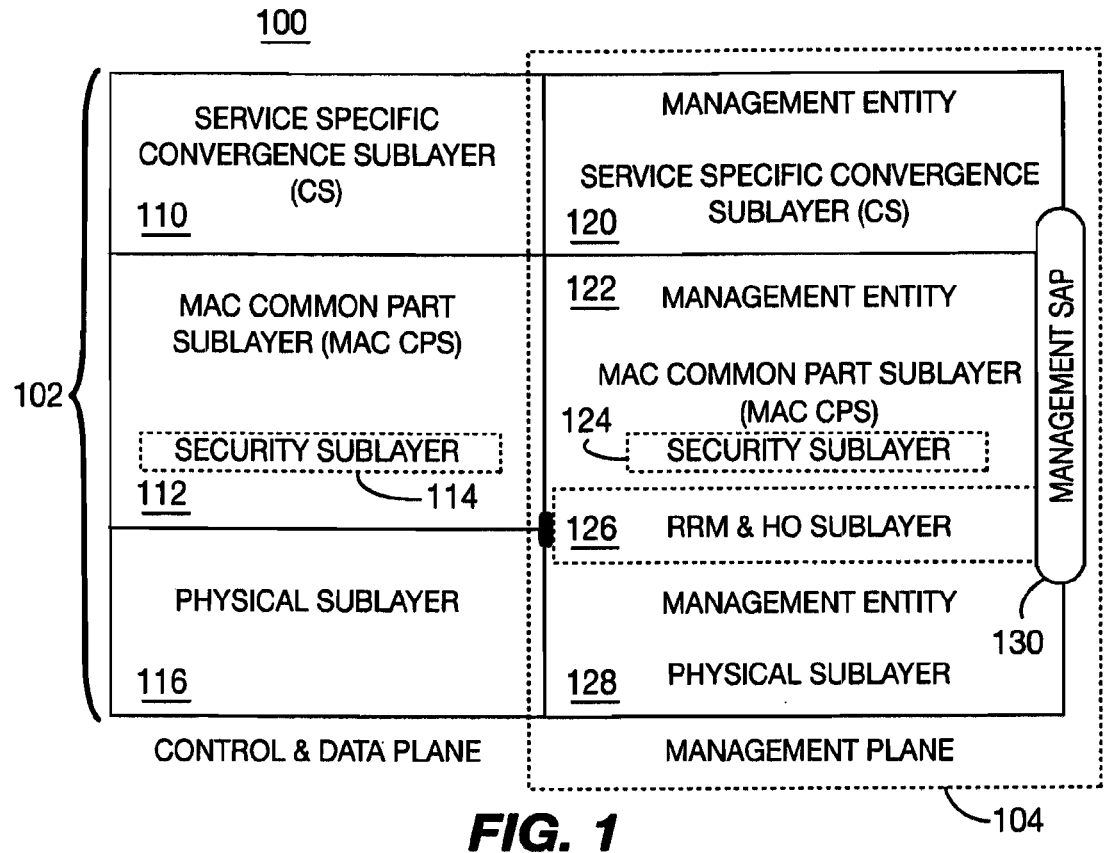
FIG. 1 is a diagram of a WMAN reference model.

FIG. 1 is a diagram of the proposed WMAN reference model 100. The model 100 includes a control and data plane 102 and a management plane 104. The control and data plane 102 includes a service specific convergence sublayer (CS) 110, a medium access control (MAC) common part sublayer (MAC CPS) 112, a security sublayer 114 (which is part of the MAC CPS 112), and a physical sublayer 116. The management plane 104 includes a service specific CS management entity 120, a MAC CPS management entity 122, a security sublayer 124 (which is part of the MAC CPS management entity 122), a RRM and HO sublayer 126, a physical sublayer management entity 128, and a management service access point (SAP) interface 130. While the RRM and HO sublayer 126 is shown in FIG. 1 as a single layer, the RRM and HO sublayer 126 can alternatively be configured as a separate RRM sublayer and an HO sublayer or the HO layer could be a sublayer to the RRM layer.

The SAP interface 130 is used to configure the MAC layer and the physical layer, and to obtain measurements from the MAC layer and the physical layer. Additionally, the SAP interface 130 connects the RRM and HO sublayer 126 to RRM and handover functionalities, which contain RRM and handover decision-making processes. The RRM and handover functionalities are located outside the MAC management entity 122. These functionalities include the algorithms that receive inputs from the MAC management entity 122 and make RRM and handover decisions. These functionalities can be located in the SME (session management entity) in the 802 reference model.

Figure 2:
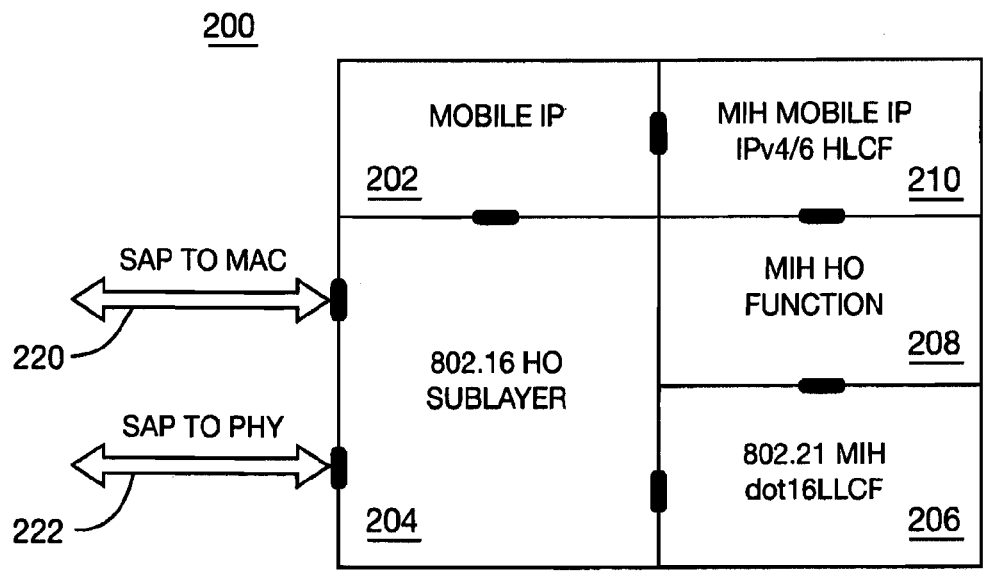
FIG. 2 is a diagram of an 802.16 g handover management plane.

FIG. 2 is a diagram of an 802.16 g-handover management plane 200. The management plane 200 includes a mobile IP part 202, an 802.16 HO sublayer 204, an 802.21 MIH dot16 lower layer convergence function (LLCF) 206, an MIH HO function 208, and an MIH mobile IP higher layer convergence function (HLCF) 210. A SAP to MAC interface 220 and a SAP to PHY interface 222 are used to connect the 802.16 HO sublayer 204 to the 802.21 MIH management plane.

Handover inside 802.16 networks is the responsibility of the 802.16 HO sublayer 204. The HO sublayer 204 configures the 802.16 MAC and physical layers to send measurements and handover triggers via the MAC and physical SAPs 220, 222, respectively. If there is a need to change the 802.16 subnet, the 802.16 HO sublayer 204 sends the triggers to the mobile IP part 202. For an inter-technology handover (e.g., 802.16 to cellular or 802.16 to 802.11), handover triggers are sent from the 802.16 HO sublayer 204 to the 802.21 MIH dot16LLCF 206. The 802.21 MIH handles the handover scenarios if there is a need to change the domain or performing a handover with other technologies.

While the management plane 200 is described in connection with an 802.16 network, the management plane can be implemented in any type of WMAN by changing the HO sublayer 204 and the LLCF 206 to correspond to the appropriate network type.

2. WMAN Logical Network Architecture

Figure 3:
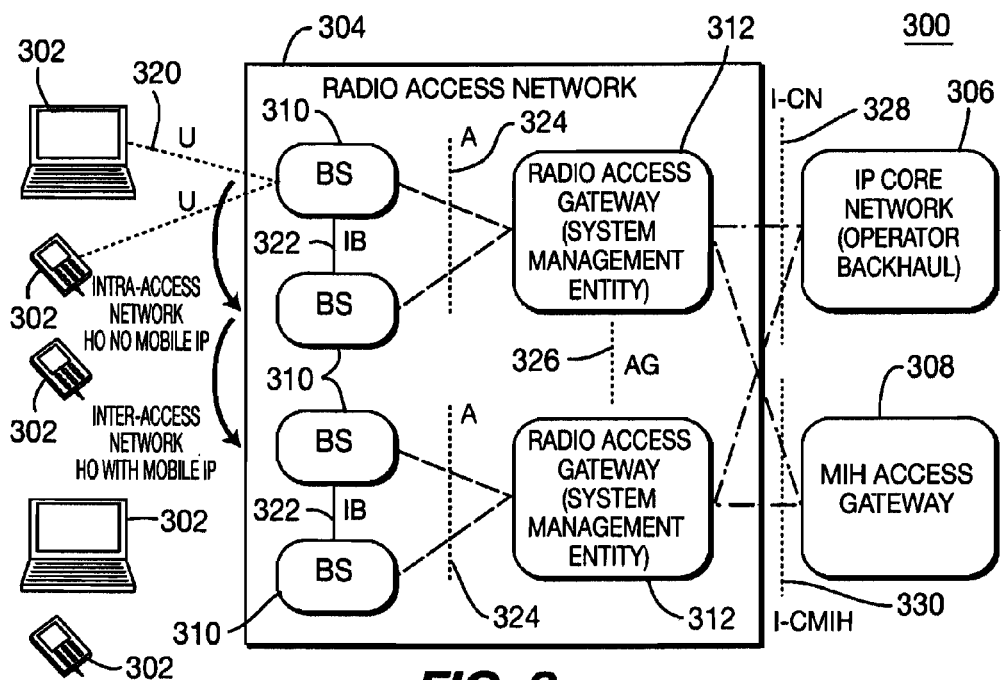
FIG. 3 is a diagram of a first embodiment of a WMAN logical network architecture.
Figure 4:
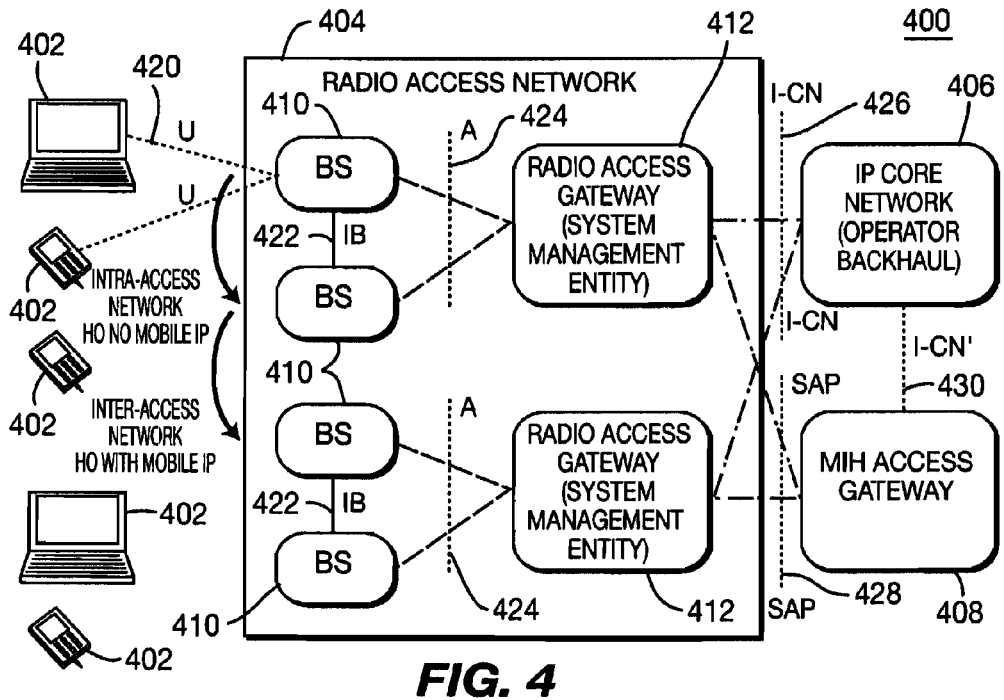
FIG. 4 is a diagram of a second embodiment of a WMAN logical network architecture.
Figure 5:
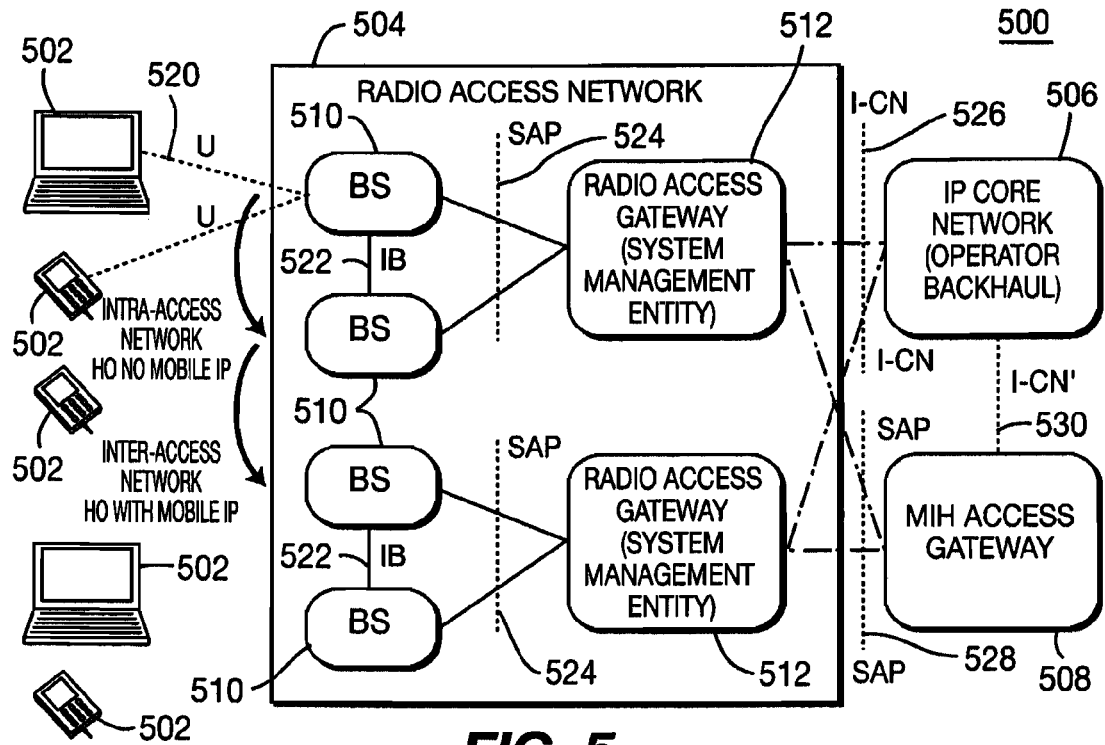
FIG. 5 is a diagram of a third embodiment of a WMAN logical network architecture.

FIGS. 3-5 present different WMAN logical network architectures, in which the physical and MAC layers are located inside the base station (BS). The HO sublayer is located in the system management entity, namely the radio access gateway. This system management entity can be responsible for one or more BSs in the same subnet. The MIH access gateway contains the 802.21 MIH functionality. The BS communicates with the mobile station subscriber via the U interface and communicates with another BS via the IB interface. The radio access network (RAN) is connected to the IP core network via the I-CN interface.

FIG. 3 shows a first embodiment of a logical architecture 300, where all logical nodes are connected via standardized logical interfaces. The architecture 300 includes a plurality of wireless stations 302, a RAN 304, an IP core network 306, and an MIH access gateway 308. The RAN 304 includes one or more base stations (BS) 310 and at least one radio access gateway 312, which is a system management entity.

A wireless station 302 communicates with a BS 310 over the U interface 320. The BSs 310 communicate with each other over the IB interface 322. The BSs 310 communicate with the radio access gateways 312 over the A interface 324; this is a reuse of the standardized A interface between the BS and the Authentication and Service Authorization server (ASA). The radio access gateways 312 communicate with each other over the AG interface 326. The radio access gateway 312 communicates with the IP core network 306 over the I-CN interface 328. The radio access gateway 312 communicates with the MIH access gateway 308 over the I-CMIH interface 330.

FIG. 4 shows a second embodiment of a logical network architecture 400. The architecture 400 includes a plurality of wireless stations 402, a RAN 404, an IP core network 406, and an MIH access gateway 408. The RAN 404 includes one or more BSs 410 and at least one radio access gateway 412, which is a system management entity.

A wireless station 402 communicates with a BS 410 over the U interface 420. The BSs 410 communicate with each other over the IB interface 422. The BSs 410 communicate with the radio access gateways 412 over the A interface 424. The radio access gateway 412 communicates with the IP core network 406 over the I-CN interface 426. The radio access gateway 412 communicates with the MIH access gateway 408 over the SAP interface 428. The IP core network 406 communicates with the MIH access gateway 408 over the I-CN' interface 430.

A third embodiment of a logical architecture 500 is shown in FIG. 5. The architecture 500 includes a plurality of wireless stations 502, a RAN 504, an IP core network 506, and an MIH access gateway 508. The RAN 504 includes one or more BSs 510 and at least one radio access gateway 512, which is a system management entity.

A wireless station 502 communicates with a BS 510 over the U interface 520. The BSs 510 communicate with each other over the IB interface 522. The BSs 510 communicate with the radio access gateways 512 over the SAP interface 524. The radio access gateway 512 communicates with the IP core network 506 over the I-CN interface 526. The radio access gateway 512 communicates with the MIH access gateway 508 over the SAP interface 528. The IP core network 506 communicates with the MIH access gateway 508 over the I-CN' interface 530.

The main difference in the architecture 500 is that the radio access gateway 512 is connected to the MIH access gateway 508 via a SAP interface (528), but it is also connected to the BS 510 via another SAP interface (524).

3. WMAN Physical Network Architecture

Figure 6:
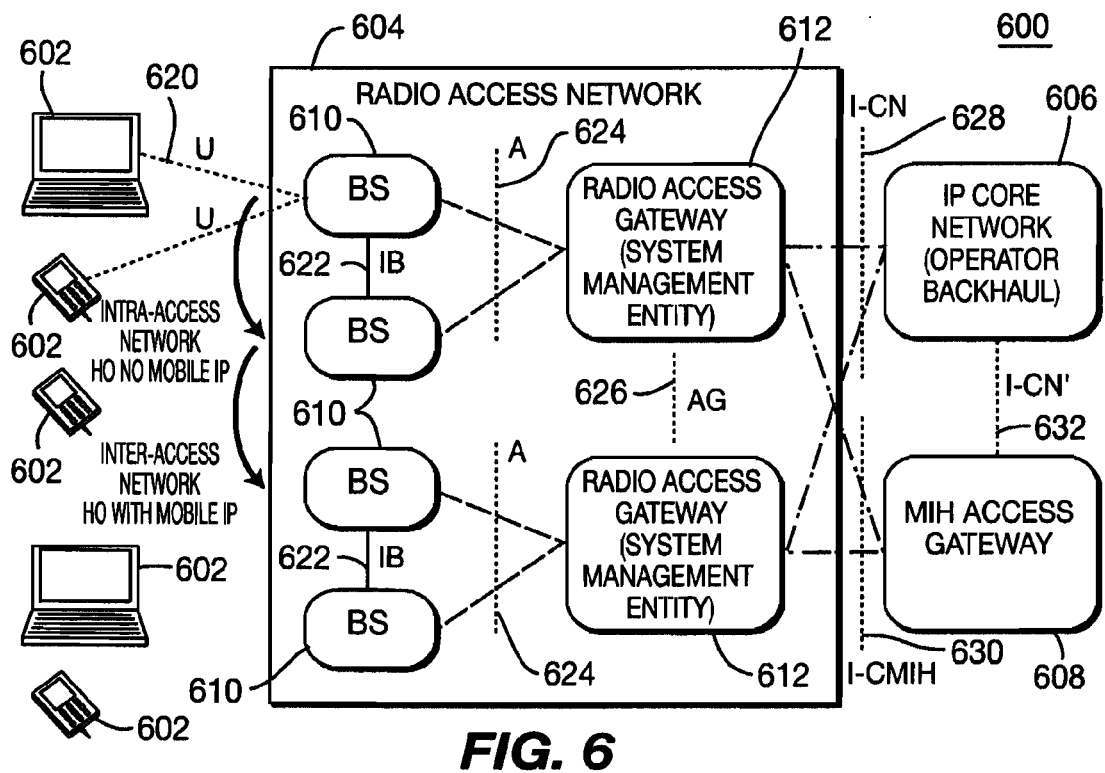
FIG. 6 is a diagram of a first embodiment of a WMAN physical network architecture.
Figure 7:
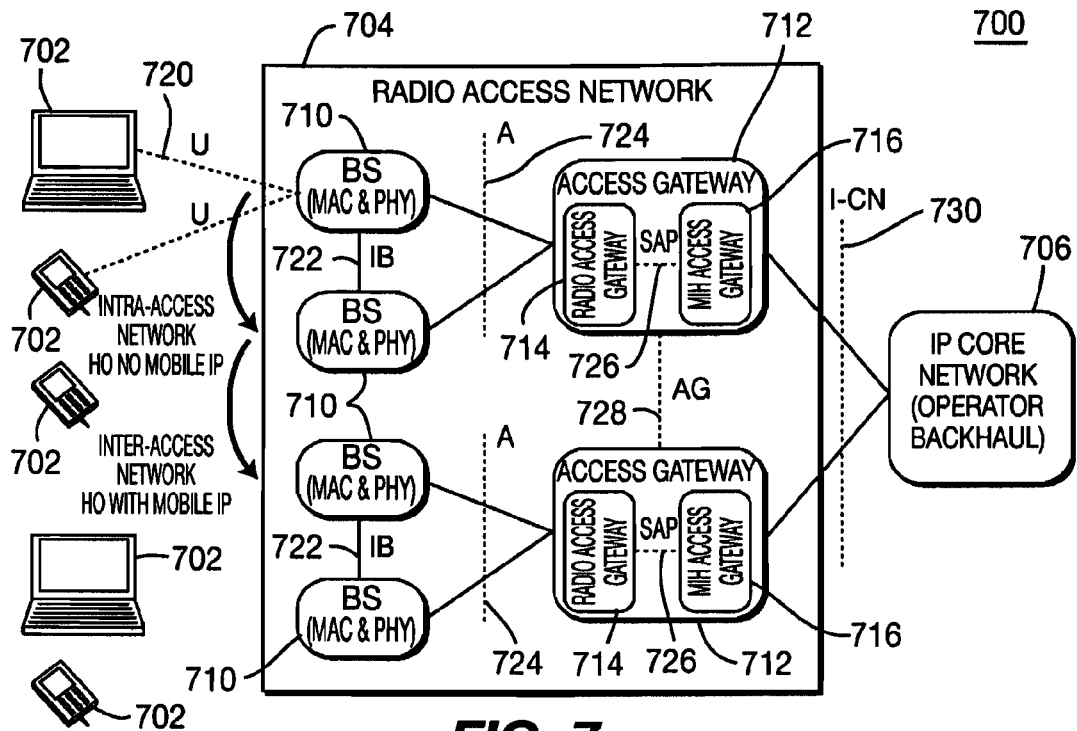
FIG. 7 is a diagram of a second embodiment of a WMAN physical network architecture.
Figure 8:
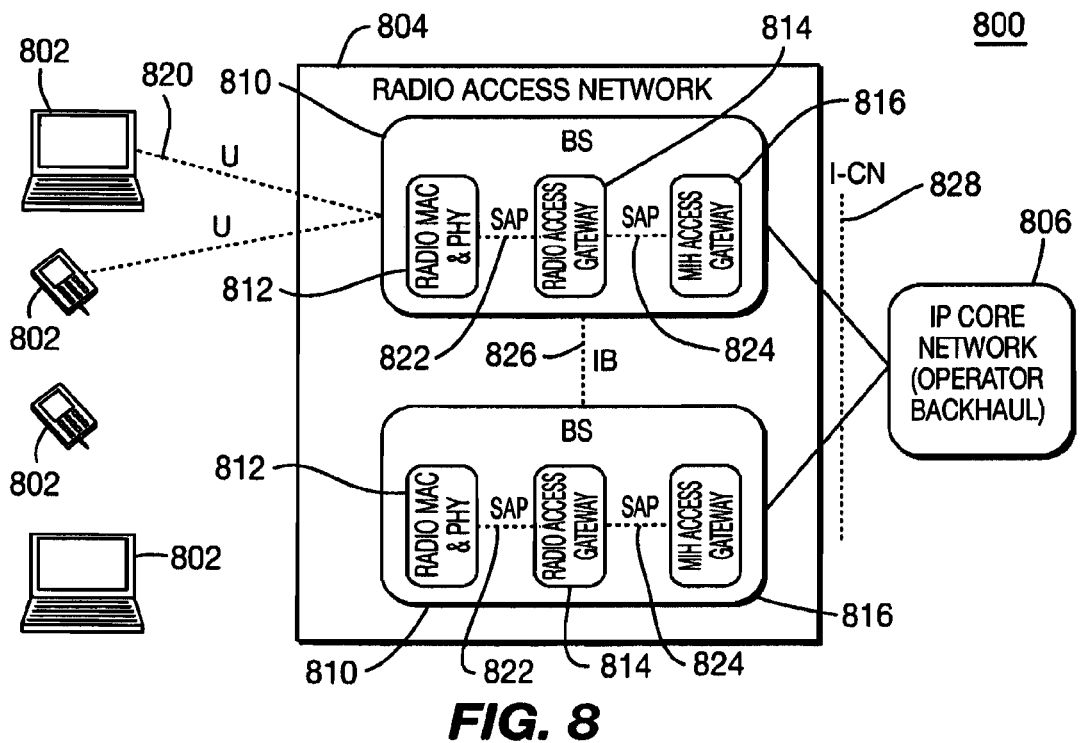
FIG. 8 is a diagram of a third embodiment of a WMAN physical network architecture.

The three logical network architecture options 300, 400, 500 allow WMAN equipment manufacturers to map these architecture options into different physical network implementations, for example as shown in FIGS. 6-8.

FIG. 6 is a diagram of a first embodiment of a physical network architecture 600. The architecture 600 includes a plurality of wireless stations 602, a RAN 604, an IP core network 606, and an MIH access gateway 608. The RAN 604 includes one or more BSs 610 and at least one radio access gateway 612, which is a system management entity.

A wireless station 602 communicates with a BS 610 over the U interface 620. The BSs 610 communicate with each other over the IB interface 622. The BSs 610 communicate with the radio access gateways 612 over the A interface 624. The radio access gateways 612 communicate with each other over the AG interface 626. The radio access gateways 612 communicate with the IP core network 606 over the I-CN interface 628. The radio access gateways 612 communicate with the MIH access gateway 608 over the I-CMIH interface 630. The IP core network 606 communicates with the MIH access gateway 608 over the I-CN' interface 632.

The architecture 600 includes three major physical nodes on the network side: the BS 610, which can contain only the physical layer and possibly the MAC layer; the radio access gateway 612, which contains the handover functionalities; and the MIH access gateway 608, which contains all the MIH functionalities (i.e., 802.21). The architecture 600 assumes the use of centralized handover management entities.

FIG. 7 is a diagram of a second embodiment of a physical network architecture 700. The architecture 700 includes a plurality of wireless stations 702, a RAN 704, and an IP core network 706. The RAN 704 includes one or more BSs 710 and at least one access gateway 712. Each access gateway 712 includes a radio access gateway 714 and an MIH access gateway 716.

A wireless station 702 communicates with a BS 710 over the U interface 720. The BSs 710 communicate with each other over the IB interface 722. The BSs 710 communicate with the access gateways 712 over the A interface 724. The radio access gateway 714 and the MIH access gateway 716 communicate with each other over a SAP interface 726. The access gateways 712 communicate with each other over the AG interface 728. The access gateways 712 communicate with the IP core network 706 over the I-CN interface 730.

The architecture 700 is an alternative implementation for the centralized solution, where all the handover functionalities (radio network and 802.21 handover) are centralized in the access gateway 712. The radio network and 802.21 handover functionalities interface with each other via the SAP interface 726 in the access gateway 712. In the architecture 700, the BS 710 contains only the physical and MAC layers.

FIG. 8 is a diagram of a third embodiment of a physical network architecture 800. The architecture 800 includes a plurality of wireless stations 802, a RAN 804, and an IP core network 806. The RAN 804 includes one or more BSs 810. Each BS 810 includes a MAC and PHY section 812, a radio access gateway 814, and an MIH access gateway 816.

A wireless station 802 communicates with a BS 810 over the U interface 820. The MAC and PHY section 812 communicates with the radio access gateway 814 over a first SAP interface 822. The radio access gateway 814 and the MIH access gateway 816 communicate with each other over a second SAP interface 824. The BSs 810 communicate with each other over the IB interface 826. The BSs 810 communicate with the IP core network 806 over the I-CN interface 828.

The architecture 800 includes a "fat" BS 810, where the radio network and 802.21 handover functionalities are implemented in the BS. The handover functionalities communicate with each other and with the Physical and MAC layers via the first and second SAPs 822, 824.

While the present invention has been described in connection with a WMAN and some examples have been provided relating to an 802.16-based network, the principles of the present invention (in particular, the management plane procedures and services and the media independent handover functionality) are applicable to any type of wireless network.

Although the features and elements of the present invention are described in the preferred embodiments in particular combinations, each feature or element can be used alone (without the other features and elements of the preferred embodiments) or in various combinations with or without other features and elements of the present invention. While the present invention has been described in terms of preferred embodiments, other variations which are within the scope of the invention as outlined in the claims below will be apparent to those skilled in the art.

What is claimed:

1. A wireless transmit/receive unit (WTRU), comprising:
   a mobile Internet protocol (IP) part;
   a handover sublayer, the handover sublayer being specific to a type of a wireless network in which the WTRU operates and configured to receive a handover instruction from within the network;
   a media independent handover (MIH) lower layer convergence function (LLCF), the LLCF being specific to a type of the wireless network;
   a MIH handover function; and
   a MIH higher layer convergence function.

2. The WTRU according to claim 1, further comprising:
   a service access point (SAP) to medium access control layer interface; and
   a SAP to physical layer interface;
   the SAP interfaces enabling communication between the handover sublayer and a MIH management plane.

3. The WTRU according to claim 1, wherein the handover sublayer is further configured to receive a handover instruction between sub-networks, the handover sublayer receiving a signal via the mobile IP part to execute the handover.

4. The WTRU according to claim 1, wherein the handover sublayer is further configured to receive a handover instruction between different technologies, the handover sublayer receiving a signal via the LLCF to execute the handover.

5. An access point (AP), comprising:
   a mobile Internet protocol (IP) part;
   a handover sublayer, the handover sublayer being specific to a type of a wireless network in which the AP operates and configured to:
      send a handover instruction from within the network;
      send a handover instruction between sub-networks, the handover sublayer sending a signal via the mobile IP part to execute the handover;
   a media independent handover (MIH) lower layer convergence function (LLCF), the LLCF being specific to a type of the wireless network;
   a MIH handover function;
   a MIH higher layer convergence function.

6. The AP according to claim 5, further comprising:
   a service access point (SAP) to medium access control layer interface; and
   a SAP to physical layer interface;
   the SAP interfaces enabling communication between the handover sublayer and a MIH management plane.

7. The AP according to claim 5, wherein the handover sublayer is further configured to send a handover instruction between different technologies, the handover sublayer sending a signal via the LLCF to execute the handover.

* * * * *